UNITED STATES PATENT OFFICE.

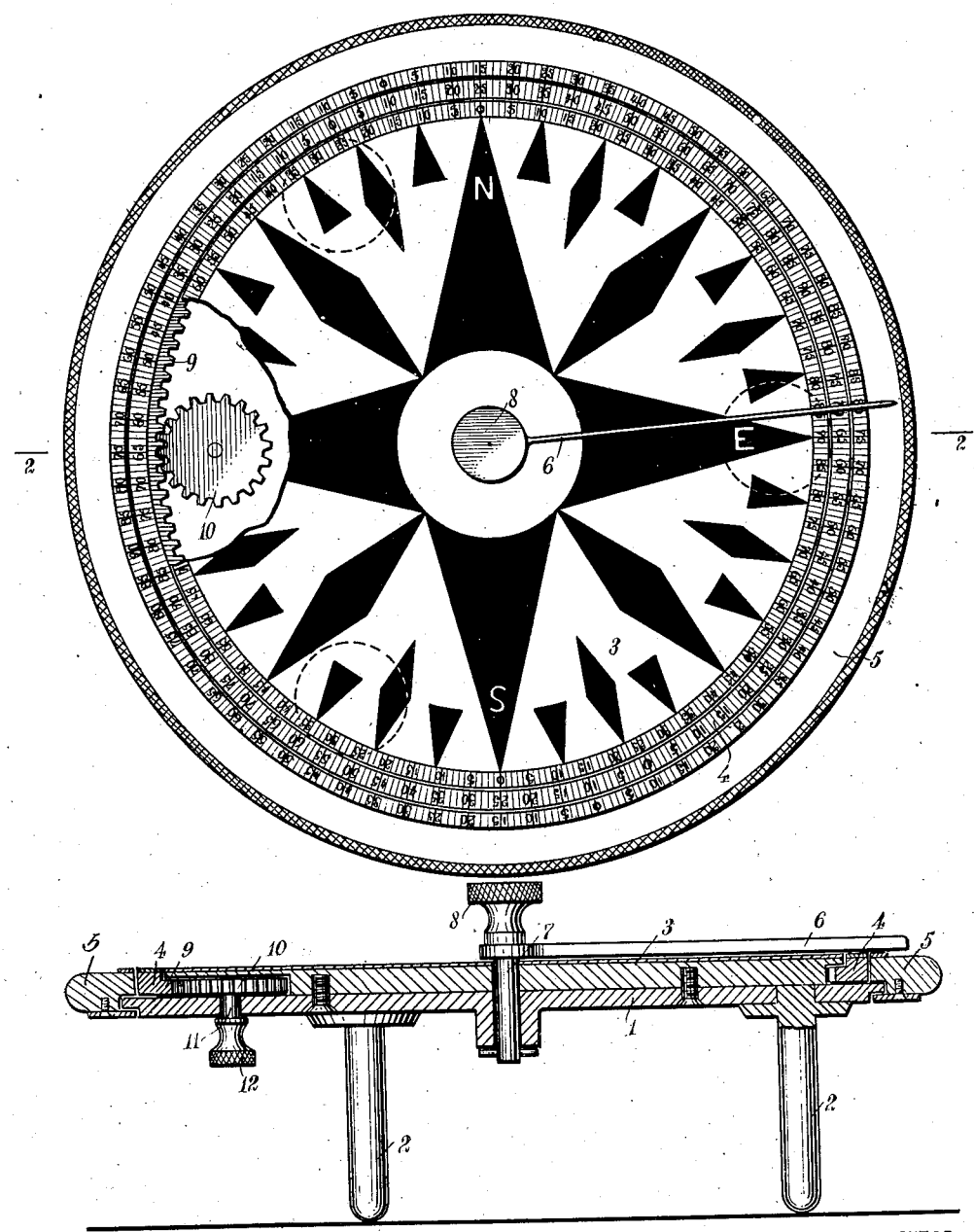

OVE BERNHARD SANDERS, OF KEY WEST, FLORIDA.

INSTRUMENT FOR USE IN NAVIGATION.

988,665.  Specification of Letters Patent.  Patented Apr. 4, 1911.

Application filed June 9, 1910.  Serial No. 565,966.

*To all whom it may concern:*

Be it known that I, OVE B. SANDERS, a subject of the King of Norway, and a resident of Key West, in the county of Monroe and State of Florida, have invented a new and Improved Instrument for Use in Navigation, of which the following is a full, clear, and exact description.

This invention relates to a new and improved instrument for use in navigation, whereby the true course is determined from the compass course in the shortest possible space of time, by mechanically allowing for the deviation and variation.

An object of this invention is to provide a device which will be simple in construction, inexpensive to manufacture, strong, durable, readily accessible, and easily operated.

A further object of this invention is to provide an instrument with a plurality of relatively adjustable circular graduations whereby the various deviations and variations may be allowed for.

These and further objects, together with the construction and combination of parts, will be more fully described hereinafter, and specifically set forth in the claims.

Reference may be had to the accompanying drawings, forming a part of this specification, in which similar characters of reference indicate corresponding parts in both the views, and in which—

Figure 1 is a top plan view of the instrument; and Fig. 2 is a vertical section on the line 2—2 of Fig. 1.

Referring more particularly to the separate parts of the device, 1 indicates a base which is preferably supported by legs 2, preferably three in number so as to form a positive support. Secured to the base 1 there is provided a plate 3, which is preferably stationary and immovable relative to the base 1, and is provided on its upper surface with divisions indicating the points of compass such as N., E., S., and W., representing north, east, south and west, with intermediate points indicated thereon. This plate 3 is also provided adjacent its periphery with a graduated circular scale indicating more accurately the various degrees, and these graduations start at zero from the north and south points, and ascend to ninety degrees at the east and west points in each direction.

Rotatably mounted on the base 1 there is provided a ring 4, which also has inscribed on its upper surface a circular graduated scale indicating in degrees angles from zero to ninety degrees in each quadrant. This graduated scale is arranged in close juxtaposition to the scale on the plate.

Concentric with the plate 3 and the ring 4 there is provided an annular member 5, which is rotatably mounted on the base 1, and is also rotatable relative to the ring 4. This annular member 5 is likewise provided with a graduated circular scale similar to the scales on the ring 4 and the plate 3, and measuring in degrees angles from zero to ninety degrees in each quadrant.

For the purpose of reading three angles in radial alinement there is provided a pointer 6, which is secured to a spindle 7, rotatably mounted in a centrally located opening in the plate 3, and the base 1. The pointer 6 and the spindle 7 are adapted to be rotated by a suitable thumb screw 8, so as to swing the pointer over the face of the various scales.

For the purpose of manipulating the ring 4, it is provided with an internal gear or rack 9, which is engaged by a pinion 10 on a shaft 11, the latter being rotatably mounted in the base 1, and adapted to be operated by a suitable thumb screw 12.

As an example of the use of the instrument, let it be assumed that the compass course is south 80° east, and that the deviation is 10° easterly, the magnetic course will then be south 70° east. If the variation is 25° westerly, then the true course will be south 95° east, or north 85° east. In place of making the necessary subtractions and additions, the zero of the scale on the outer annular member 5, as illustrated in Fig. 1, is set ten points easterly of the zero of the scale on the ring 4, thus correcting for the deviation. The ring 4 and the annular member 5 are then moved 25° westerly; that is to say, the zero on the scale on the ring 4 is offset westerly 25° relative to the zero on the plate 3. The pointer 6 is then set at south 80° east to indicate the compass course. The magnetic course can then be directly read as south 70° east on the scale on the ring 4, and the true course will be directly readable on the scale on the plate 3 as north 85° east. The three readings are brought into alinement by means of the pointer 6, after the deviation and variation have been allowed for. It will thus be seen that a simple and readily operated means for almost instantaneously obtaining the true course from the compass course, when the deviation and variation are known, is provided.

While I have shown one embodiment of my invention, I do not wish to be limited to the specific details thereof, but desire to be protected in the various changes, alterations and modifications which I may make within the scope of the appended claims.

Having thus described my invention I claim as new and desire to secure by Letters Patent;

1. The combination with a base, of a circular plate secured to said base, and having a circular scale on its outer periphery, indicating degrees from zero to ninety degrees, starting from opposite ends of a diameter of said plate, and extending to the right and left in both directions to the ends of a diameter located at right angles to said first-mentioned diameter, an annular member having a scale thereon, rotatably mounted on said base, and a ring having a scale thereon rotatably mounted on said base, said scale on said ring being arranged in juxtaposition to said scales on said annular member and said plate.

2. The combination with a base, of a circular plate secured to said base, and having a circular scale on its outer periphery, indicating degrees from zero to ninety degrees, starting from opposite ends of a diameter of said plate, and extending to the right and left in both directions to the ends of a diameter located at right angles to said first-mentioned diameter, an annular member having a scale thereon, rotatably mounted on said base, a ring having a scale thereon rotatably mounted on said base, said scale on said ring being arranged in juxtaposition to said scales on said annular member and said plate, and means for rotating said ring.

3. The combination with a base, of a circular plate secured to said base, and having a circular scale on its outer periphery, indicating degrees from zero to ninety degrees, starting from opposite ends of a diameter of said plate, and extending to the right and left in both directions to the ends of a diameter located at right angles to said first-mentioned diameter, an annular member having a scale thereon, rotatably mounted on said base, a ring having a scale thereon rotatably mounted on said base, said scale on said ring being arranged in juxtaposition to said scales on said annular member and said plate, said ring having an internal annular rack thereon, a gear rotatably mounted on said base engaging said rack, and means for operating said gear.

4. The combination with a base, of a three-point support for said base, a plate connected to said base and having a circular scale thereon, a ring rotatably mounted on said base and having a circular scale arranged in juxtaposition to said first-mentioned scale, an annular member rotatably mounted on said base and having a scale arranged in juxtaposition to said second-mentioned scale, means for manipulating said ring relative to said plate, and said annular member, and a pointer rotatably mounted on said base and adapted to indicate alined graduations on said scales.

In testimony whereof I have signed my name to this specification in the presence of two subscribing witnesses.

OVE BERNHARD SANDERS.

Witnesses:
N. N. HESSEN,
BENNY JENSEN.